No. 843,393. PATENTED FEB. 5, 1907.
W. T. GEORGE.
PLOW OR CULTIVATOR.
APPLICATION FILED OCT. 16, 1906.

2 SHEETS—SHEET 1.

WITNESSES

INVENTOR
William T. George
BY
ATTORNEYS

No. 843,393. PATENTED FEB. 5, 1907.
W. T. GEORGE.
PLOW OR CULTIVATOR.
APPLICATION FILED OCT. 16, 1906.
2 SHEETS—SHEET 2.
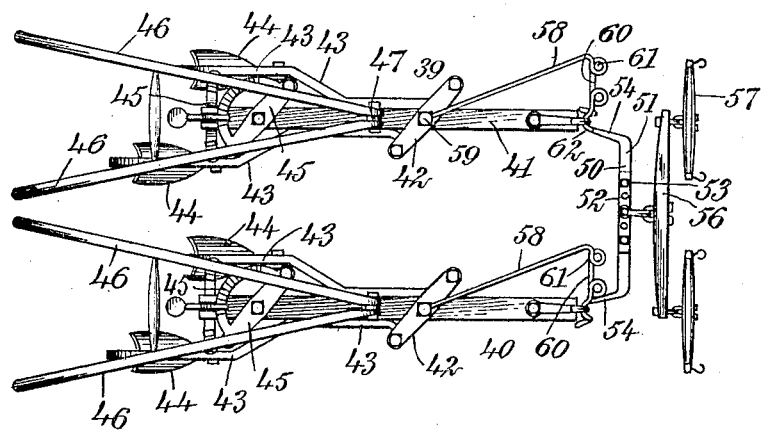
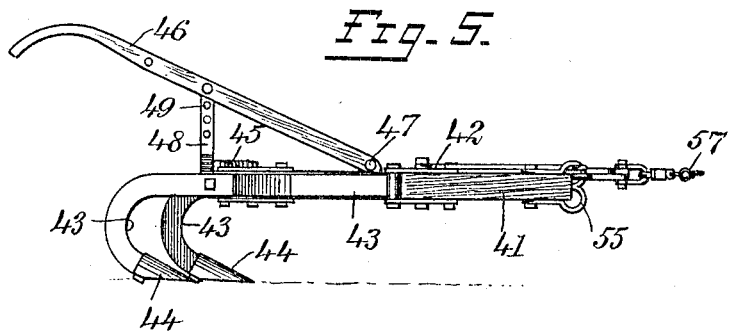
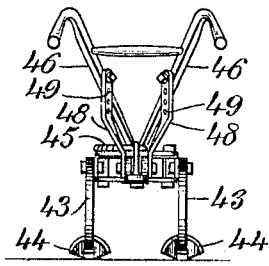
WITNESSES
INVENTOR
William T. George
BY
ATTORNEYS

UNITED STATES PATENT OFFICE.

WILLIAM T. GEORGE, OF FAYETTEVILLE, TENNESSEE, ASSIGNOR OF ONE-HALF TO JAMES A. MOORES, OF FAYETTEVILLE, TENNESSEE.

PLOW OR CULTIVATOR.

No. 843,393.     Specification of Letters Patent.     Patented Feb. 5, 1907.

Application filed October 16, 1906. Serial No. 339,154.

*To all whom it may concern:*

Be it known that I, WILLIAM T. GEORGE, a citizen of the United States, and a resident of Fayetteville, in the county of Lincoln and State of Tennessee, have invented a new and Improved Plow or Cultivator, of which the following is a full, clear, and exact description.

This invention relates to agricultural implements, and especially to plows or cultivators.

The object of the invention is to produce a plow or cultivator the shovels of which may be quickly adjusted so as to change their relative position.

More specifically, the object of the invention is to enable the distance between the shovels of the cultivator or plow to be adjusted in a transverse direction with respect to the direction of advance of the implement, and, further, to provide an arrangement which will enable the degree of advance of certain shovels with respect to the others to be adjusted.

The invention consists in the construction and combination of parts to be more fully described hereinafter and particularly set forth in the claims.

Reference is to be had to the accompanying drawings, forming a part of this specification, in which similar characters of reference indicate corresponding parts in all the figures.

Figure 1:
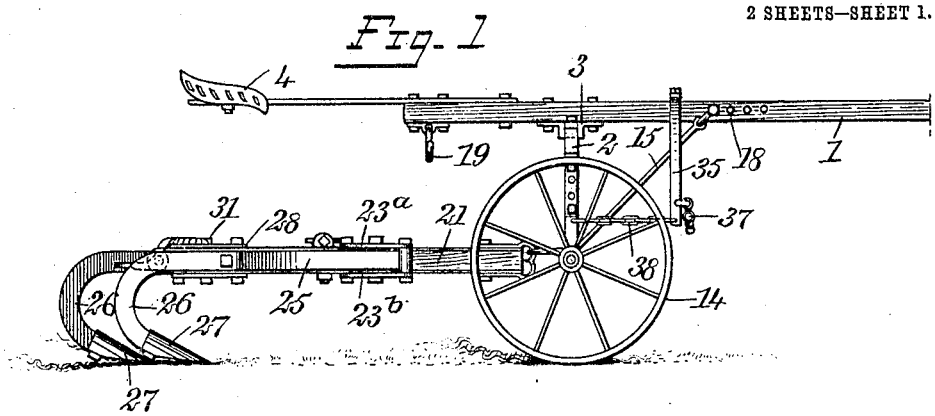
Figure 2:
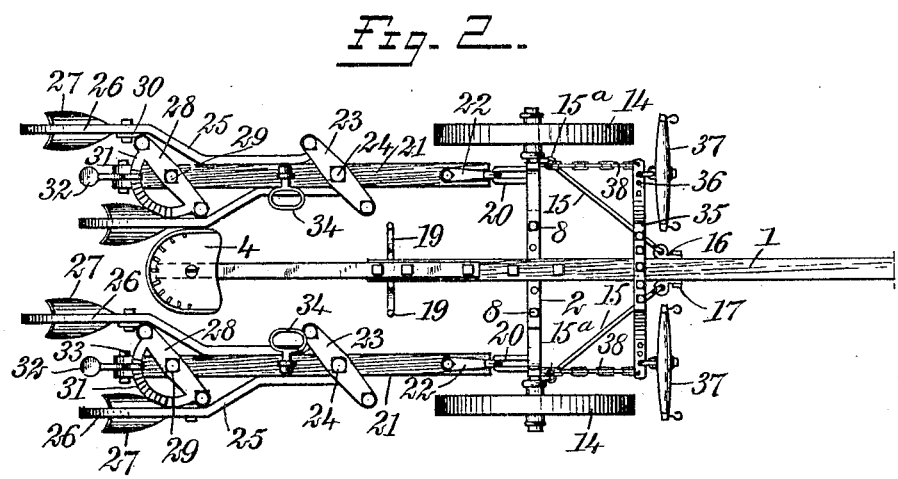
Figure 3:
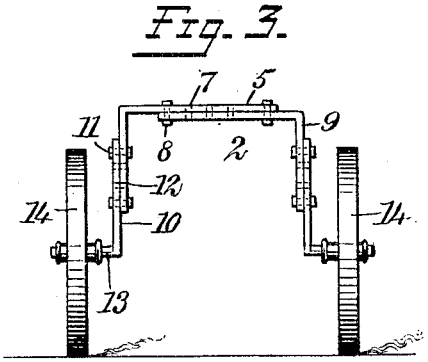

Figure 1 is a side elevation of the preferred form of the plow or cultivator, a portion of the pole or tongue being broken away. Fig. 2 is a plan of the implement as shown in Fig. 1. Fig. 3 is a rear elevation of a part of the implement and illustrating the construction of the parts or axle-frame. Fig. 4 is a plan showing a modified form which the invention may take and in which the complete cultivator is composed of two separable units or single implements. Fig. 5 is a side elevation of the implement as constructed in Fig. 4, and Fig. 6 is a rear elevation of one of the single implements which are used to form the cultivator shown in Fig. 4.

Referring more particularly to the parts, and especially to Figs. 1 to 3, 1 represents the pole of the implement, which is attached to the axle-frame or arch 2 by means of a suitable clip or bracket 3. The rear portion of the pole extends beyond the axle frame or arch 2 and carries a seat 4 for the driver of the implement. The construction of the arch or axle-frame 2 is very clearly shown in Fig. 3. It is comprised of two angle-frames having horizontal arms 5, which overlap and which are provided with alining openings 7, in which removable bolts 8 may be passed, which enable the angle-frames to be securely attached together. These angle-frames are formed with vertical arms 9, which project downwardly, and to these arms wheel-brackets 10 are attached by means of removable bolts 11, and these wheel-brackets 10 and the arms 9 are formed with alining openings 12 similar to the openings 7.

At their lower extremities the wheel-brackets 10 are formed with outwardly-projecting arms or spindles 13, which receive the wheels 14 of the implement. The frame or arch 2 is attached to the pole at a point substantially midway between the vertical arms 9. By means of the alining openings 7 the width of the arch or frame 2 may be adjusted. This is accomplished by moving the bolts 8 and extending the parts with respect to each other, so that a new set of openings are brought into alinement. The bolts are then replaced and hold the frame in a more or less extended condition. The height of the arch or frame may also be adjusted in a similar manner by means of the openings 12, referred to in connection with the wheel-brackets and the vertical arms 9. I provide diagonal braces or tie-rods 15, which connect the wheel brackets 10 with the pole 1. These braces are attached by a swivel or eye connection 15ᵃ with their corresponding brackets and at their forward or upper extremities are attached to eye-plates 16, which eye-plates are adapted to be attached in adjustable relation by means of a through-bolt 17, which may occupy any one of a plurality of openings 18, which extend transversely through the pole, as shown. On the rear extremity of the pole 1 a pair of oppositely-projecting hooks 19 are provided, the purpose of which will appear more fully hereinafter.

From the lower rear portions of the brackets 10 staples 20 project rearwardly. To these staples the beams 21 are attached by means of clevises 22, as shown. At or near their middle portions the beams 21 are provided with cross-heads 23, which are pivotally attached to the beams at their middle points by suitable bolts 24, as indicated. At the outer extremity of the cross-heads 23 shovel-bars or hoe-bars 25 are attached. The bodies of these hoe-bars are disposed parallel with the beams 21, as shown; but the rear extremities are offset outwardly to form rear extensions 26 and are curved downwardly, so as to receive shovels or hoes 27, respectively, as shown. To the rear portion of each of the beams 21 a locking-segment 28 is attached by a suitable pivot-bolt 29. This segment is provided with a cross-bar, as shown, the extremities whereof are pivotally attached to brackets 30, carried, respectively, by the rear extensions 26 of the hoe-bars. These locking-segments are formed on their rear sides each with a circumferentially-disposed rim 31, and these rims have teeth adapted to be engaged by a latch 32, the said latches being pivoted upon suitable bolts 33, disposed at the rear extremities of the beams, respectively, as shown. The forward portions of each of these latches is formed into a toe adapted to engage the teeth, as will be readily understood, while the rear portion is formed into a plate adapted to be depressed to release the toe. From this arrangement it should be understood that if the cross-heads 23 occupy an inclined position, such as that shown in Fig. 2, the left-hand hoe carried by the left-hand beam will be disposed rearwardly with respect to the other hoe carried by this beam, and a corresponding arrangement will obtain on the opposite side of the implement. If, however, the cross-heads 23 are thrown into a reversed position, an opposite arrangement will result. In addition to these two possible arrangements it should be understood that the cross-heads may be arranged so that their longitudinal axes extend at right angles to the pole. With this arrangement the hoes 27 will be in alinement and abreast of each other. Furthermore, one of the cross-heads 23 may be permitted to occupy the position shown in Fig. 2, while the opposite one is thrown into a reverse position. With this arrangement a symmetrical arrangement of the hoes will result, symmetrical with respect to the pole or longituidnal axis of the implement. Thus suppose that the right-hand cross-head is thrown into a position reverse from that shown in the figure, then the inner hoe-bar, carried by the right-hand beam, will be thrown into an advance position lying opposite to the inner hoe-bar of the opposite beam, while the upper hoe-bar of the right-hand beam will move rearwardly, so as to lie abreast of the outer hoe-bar of the opposite beam. In this way any desired relation of the hoes may be produced.

In order to give the cross-heads 23 greater strength, they are preferably formed of two flat bars 23$^a$ and 23$^b$. The bars 23$^a$ rest upon the upper side of the beam, while the bars 23$^b$ rest upon the under side of the beam. If it is desired to adjust the plow so as to change the distance between the beams 21, this may evidently be accomplished by extending the axle frame or arch in the manner described above.

At a suitable point on the beams 21 I attach handles 34, which operate as foot-rests for the driver and which also enable the plows to be held in an elevated position when the implement is being driven to or from the field. In this connection it should be understood that when it is desired to hold the beams in an elevated position such as that suggested the handles 34 are hooked over the hooks 19.

In order to enable draft-animals to be conveniently attached, I provide a draft-bar 35, which is attached to the pole 1 forwardly of the arch, as shown. The outer extremities of this draft-bar are inclined downwardly and are provided with a plurality of openings 36, which facilitate the adjustable attachment of swingletrees 37. The lower extremities of the draft-bars 35 are connected, respectively, by chains 38 with the wheel-brackets 10, as indicated most clearly in Figs. 1 and 2.

In Figs. 4 to 6 I illustrate a modified form which consists of two single cultivators 39 and 40, which are similar in construction. Each of these cultivators comprises a beam 41, upon which a cross-head 42 is mounted, carrying hoe-bars 43 and hoes 44, the mountings upon the beams being substantially similar to those described in connection with the preferred form—that is, the rear portions of the hoe-bars are connected by locking-segments 45, which enable the hoes to be locked in any desired relation. However, the separate cultivators in this instance are not provided with the handles 34, referred to in connection with the preferred form. Each beam is, however, provided with permanent handles 46, which are pivotally attached at their forward extremities to a bracket 47, which projects upwardly from the middle portion of the beam, as shown. These handles are supported upon uprights or standards 48, which standards are attached to the rear portion of the beam, as indicated. The upper portions of these standards are provided with a plurality of openings 49, which enable the handles to be adjustably attached at any desired height, as will be readily understood. The two cultivators are connected by an extensible frame 50, which consists of two overlapping bars 51, having alining openings 52, through which removable bolts 53 are received, as shown. At the outer extremities of the bars 51 are rearwardly-disposed inclined extensions or arms 54, which are formed into hooks which engage the clevises 55, carried by the lower extremity of the beams 41. At the middle portion of the extension-frame 50 a doubletree 56 is attached, and this doubletree carries swingletrees 57. Evidently by removing the bolts 53 the bars 51 of the extension-frame may be attached in adjusted positions, so as to give the extension-frame a greater or less width, if desired. In other words, the distance between the beams 41 may be altered. When the extension-frame 50 is disconnected, evidently the cultivators 39 and 40 may be used separately. In order to enable a draft-animal to be attached thereto, I provide each of the beams 41 with a draft-bar 58, which draft-bar has an inclined extension which is attached to the pivot-bolt 59 of the cross-head and has a forward extension 60 bent to form hitching-eyes 61 and having its extremity formed into a hook 62, which is received in the clevis 55, as shown. The whiffletree may be attached to either of the eyes 61, so that the draft animal or animals may be removed more or less laterally from the axis of the beam, as desired. Evidently with this form of the invention all of the adjustments of the hoes described in connection with the preferred form are possible.

With both forms of the implement it should be understood that as the teeth upon the locking-segments are continuous the hoes may be arranged in any relation intermediate or between those specifically described above.

Having thus described my invention, I claim as new and desire to secure by Letters Patent—

1. In an implement of the class described, in combination, an extension-frame having transverse overlapping bars with alining openings therein, bolts adjustably attaching said bars, beams attached to said frame, cross-heads pivotally mounted on said beams, hoe-bars carried by said cross-heads and carrying hoes, and locking-segments connected with said hoe-bars and affording means for locking the said hoe-bars in adjusted relations.

2. In an implement of the class described, in combination, a beam, a cross-head pivotally mounted thereupon, hoe-bars pivotally attached to said cross-head, a locking-segment pivotally attached to said hoe-bars and having circumferentially-disposed teeth, and a latch adapted to engage said teeth.

3. In an implement of the class described, in combination, a transversely-extensible frame, beams attached to the rear side thereof, cross-heads pivotally attached to said beams, locking-segments pivotally attached to said beams rearwardly of said cross-heads, said segments having circumferentially-disposed teeth, and cross-bars, said cross-bars being disposed parallel respectively with said cross-heads, hoe-bars pivotally attached to the extremities of said cross-heads and said cross-bars, hoes carried thereby, and locking means mounted on said beams and engaging said teeth to lock said segments.

In testimony whereof I have signed my name to this specification in the presence of two subscribing witnesses.

WILLIAM T. GEORGE.

Witnesses:
B. E. HOLMAN,
J. W. HOLMAN.